United States Patent [19]
Beard et al.

[11] Patent Number: 5,084,167
[45] Date of Patent: Jan. 28, 1992

[54] OXIDATION DITCH FOR TREATMENT OF WASTE WATER

[76] Inventors: Harold J. Beard, 1111 Colonial Dr., Baton Rouge, La. 70806; Raleigh L. Cox, 15582 Summerwood, Baton Rouge, La. 70817

[21] Appl. No.: 425,823

[22] Filed: Oct. 23, 1989

[51] Int. Cl.$^5$ .............................................. C02F 3/16
[52] U.S. Cl. .................................. 210/194; 210/219; 210/926
[58] Field of Search ................ 210/926, 194, 219, 629

[56] References Cited

U.S. PATENT DOCUMENTS 3,473,790 10/1969 Auler et al. ......................... 210/219
4,269,709 5/1981 Rongved ............................. 210/926
4,844,802 7/1989 Hove ................................... 210/926

FOREIGN PATENT DOCUMENTS 2636221 10/1977 Fed. Rep. of Germany .
60-114397 6/1985 Japan .

Primary Examiner—Stanley Silverman
Assistant Examiner—Christopher Upton
Attorney, Agent, or Firm—Robert C. Tucker; William D. Kiesel

[57] ABSTRACT

An oxidation ditch for circulating a waste water stream and having a channel formed by a continuous vertical outside wall extending upward from a bottom and having at least one section shaped to form a curved area into which a vertical turbine is operatively positioned and by a partition wall also extending upward from the bottom and positioned inside the outside wall with one of its ends adjacent the vertical turbine, the improvement of which comprises a baffle positioned in the channel upstream of the vertical turbine to minimize the mixing of the upstream waste water with the backwash created by the vertical turbine.

5 Claims, 4 Drawing Sheets

OXIDATION DITCH FOR TREATMENT OF WASTE WATER

BACKGROUND OF THE INVENTION

1. Field of the Invention

This invention relates in general to orbital oxidation ditches, and more particularly to apparatus contained therein to improve clarification of waste water circulating in an orbital oxidation ditch.

2. Prior Art

One known method for the clarification of waste water utilizes an orbital oxidation ditch to aerate waste water through the use of vertical turbines as part of the clarification process. This is achieved by the vertical turbine mixing oxygen with the oncoming waste water stream within the vertical turbine. These ditches are generally used with either external clarifiers or intra-channel clarifiers such as the BOAT®. BOAT® is a registered trademark to identify an intra-channel clarifier manufactured by United Industries, Inc.

A typical external clarifier ditch configuration is shown in FIG. 1. In this configuration the waste water flowing in the direction indicated by the arrows enters the vertical turbine area which aerates the waste water stream as it flows through the vertical turbine blades. For the desired amount of aeration to occur the vertical turbine must be sized to create a predetermined minimum velocity of the waste water entering the vertical turbine. However as the aerated waste water stream leaves the vertical turbine a portion of the stream known as "backwash" is directed back toward the oncoming waste water stream. This results in a slowing of the velocity of the waste water stream entering the vertical turbine area. Thus to counteract this loss of velocity the vertical turbine must be sized with regard to the radius of its blades, as well as its speed, to accommodate this loss of velocity. Thus because of the effect of the backwash more energy is required to operate the vertical turbine in order to achieve the desired waste water velocity in the ditch.

FIG. 2 illustrates a typical ditch configuration utilizing an intra-channel clarifier. These clarifiers are generally located in a straight section of the ditch near one of the curved sections. A portion of the waste water stream enters the intra-channel clarifier before the waste water enters the vertical turbine. It is important for the efficient operation of the intra-channel clarifier that the turbulence of the waste water entering the intra-channel clarifier be kept to a minimum. The backwash from the vertical turbine creates additional undesirable turbulence at the point that the waste water is to enter the intra-channel clarifier causing a reduction in the efficiency of the intra-channel clarifier.

In either of the two configurations it would be highly desirable if the vertical turbine speed could be reduced as this would not only reduce the energy requirements of the oxidation ditch system, but would allow greater flexibility to meet the required aeration levels as the characteristics of the waste water stream changed.

OBJECTS AND SUMMARY OF THE INVENTION

Therefore, it is an object of this invention to provide an oxidation ditch requiring less energy to operate.

Another object of this invention is to provide an oxidation ditch having greater flexibility in dealing with changing waste water stream characteristics to meet required aeration levels.

Another object of this invention is to provide an oxidation ditch which has less turbulent wastewater flow upstream of the vertical turbine.

Still another object of this invention is to provide a baffle positioned on the upstream side of the vertical turbine to minimize mixing of the backwash from the vertical turbine with the oncoming waste water stream.

A further object of this invention is to provide a baffle positioned in an orbital oxidation ditch between the vertical turbine and an intra-channel clarifier so as to minimize the turbulence at the point where the waste water enters the intra-channel clarifier normally created by the backwash from the vertical turbine.

These and other objects and advantages of this invention shall become apparent from the ensuing descriptions of the invention.

Accordingly, an oxidation ditch for treating waste water having a channel through which the waste water flows, wherein the channel is formed by a bottom, a continuous outside vertical wall extending upward from the bottom and having one or more curved sections and a partition wall positioned vertically upward from the bottom and inside the continuous outside vertical wall, and a vertical turbine fixedly mounted in that portion of the channel formed by one of the curved sections and the partition wall to receive the waste water as its flows in the channel, the improvement of which comprises a baffle means fixedly positioned in the channel upstream of said vertical turbine to receive at least some of the backwash resulting from the waste water flowing through the vertical turbine.

PREFERRED EMBODIMENTS OF THE INVENTION

Figure 1:
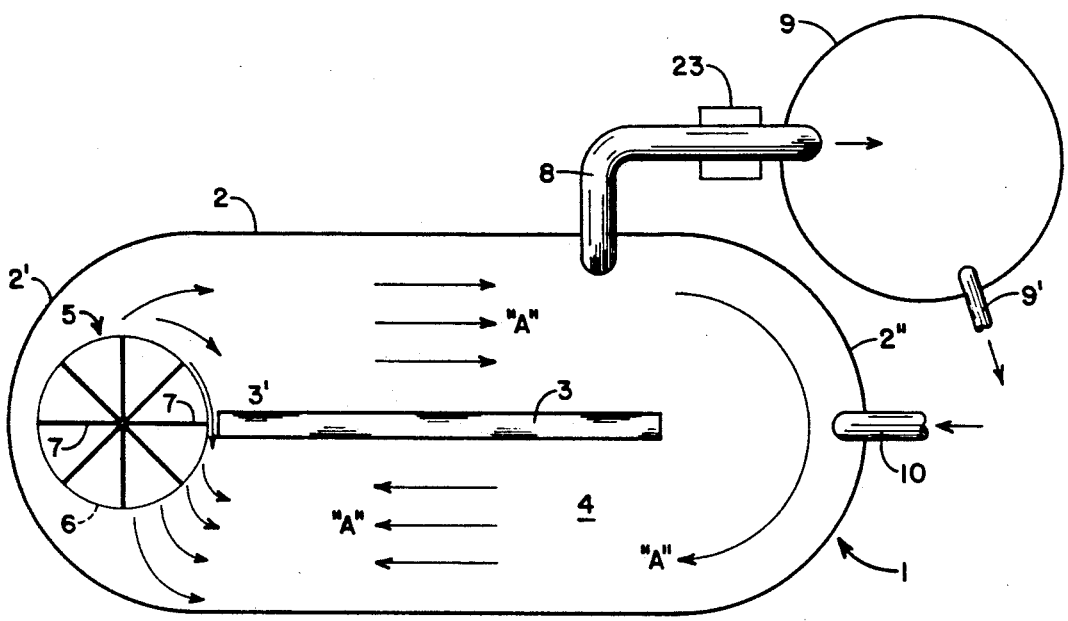
FIG. 1 is a top view of a typical prior art oxidation ditch utilizing an external clarifier.

Turning to FIG. 1 waste water from an external source such as a sewerage line is pumped through a duct 10 into a conventional orbital oxidation ditch 1 having a vertical side wall 2 extending upward from the ditch bottom which with vertical partition wall 3 form a continuous channel 4 through which the waste water flows in the direction indicated by arrows "A". Side wall 2 is shaped to have curved sections 2' and 2" which define the end areas of the channel 4. A vertical turbine 5 is positioned in one of the end areas so that the circle 6 formed by the outer tip of the rotating turbine blades 7 lies near one end 3' of partition wall 3. As the turbine blades are rotated by a power source (not shown) such as a motor they aerate the waste water and cause it to circulate in the channel generally in the direction indicated by arrows "A". Downstream of turbine 5 a portion of the aerated waste water is removed through duct 8 by pumping means 23 and sent to an external clarifier 9 for further purification treatment. The clarified water is then discharged through duct 9' into a stream or other body of water.

However because of the construction of the turbine blades the waste water leaves the turbine in various directions indicated by arrows "B" and "C". That portion of the flow indicated by "C" is referred to as "backwash" and impedes the flow of the waste water into the turbine. In order to achieve the desired amount of waste water aeration it is necessary to maintain the velocity and volume of the waste water entering the turbine within certain levels. To achieve these levels the power source must be sized (i.e. horsepower and/or rpm) to overcome the impeding effect of the backwash generated by the turbine.

Figure 2:
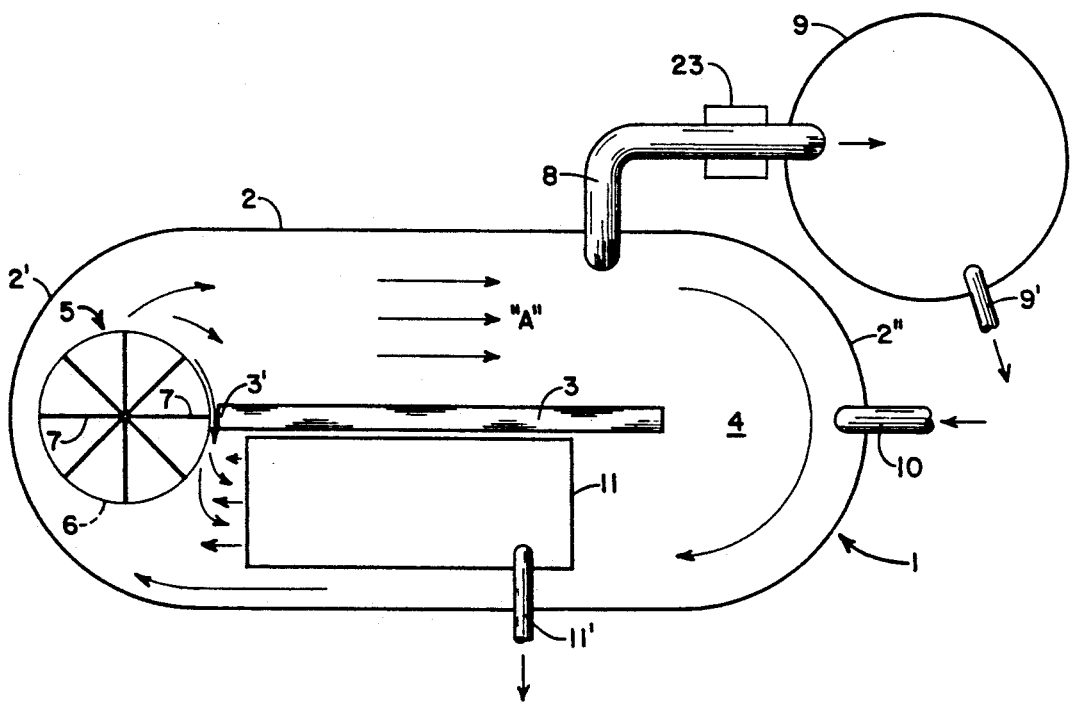
FIG. 2 is a top view of a typical prior art oxidation ditch utilizing an intra-channel clarifier.
Figure 3:
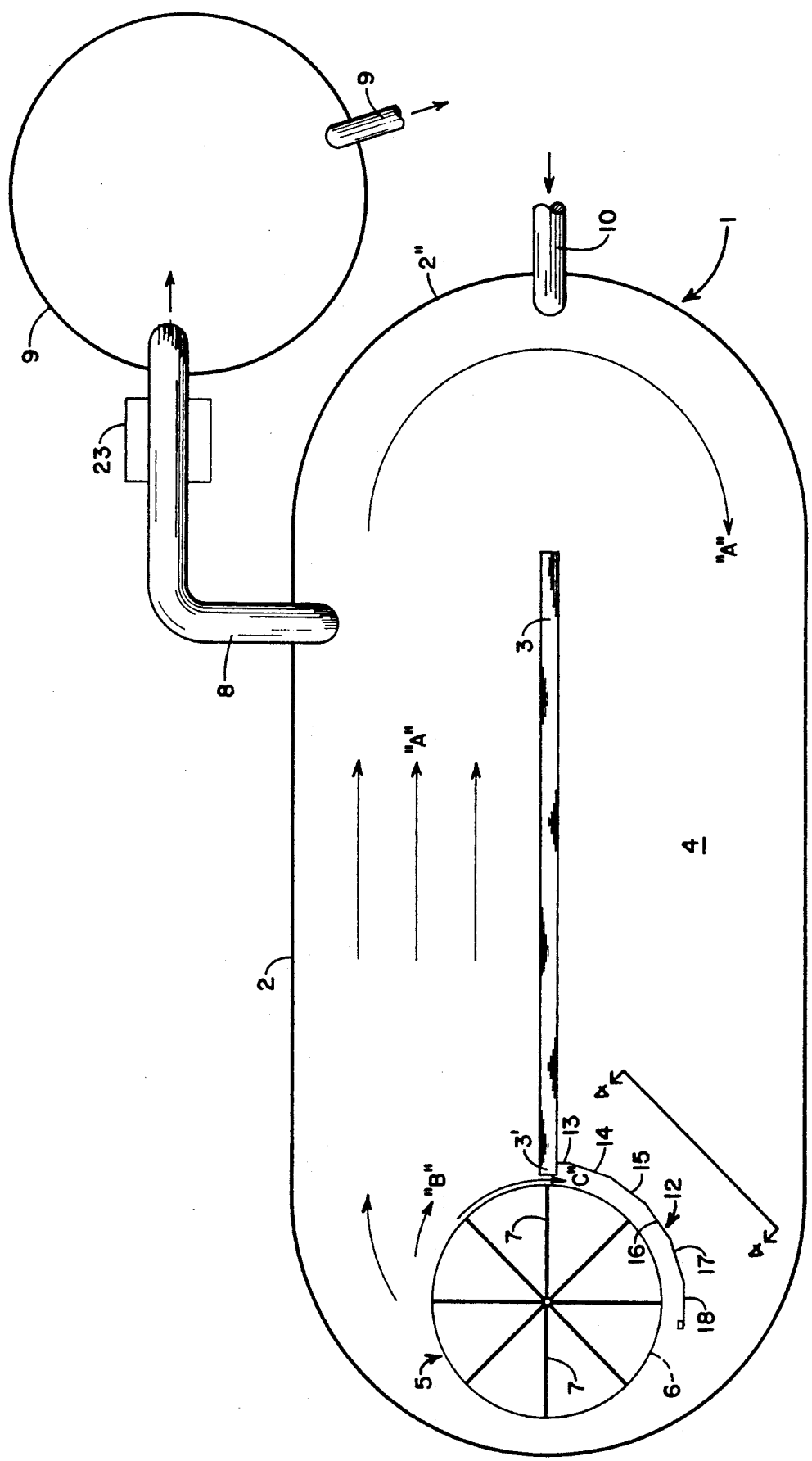
FIG. 3 is a top view of a oxidation ditch utilizing the baffle means of this invention.
Figure 4:
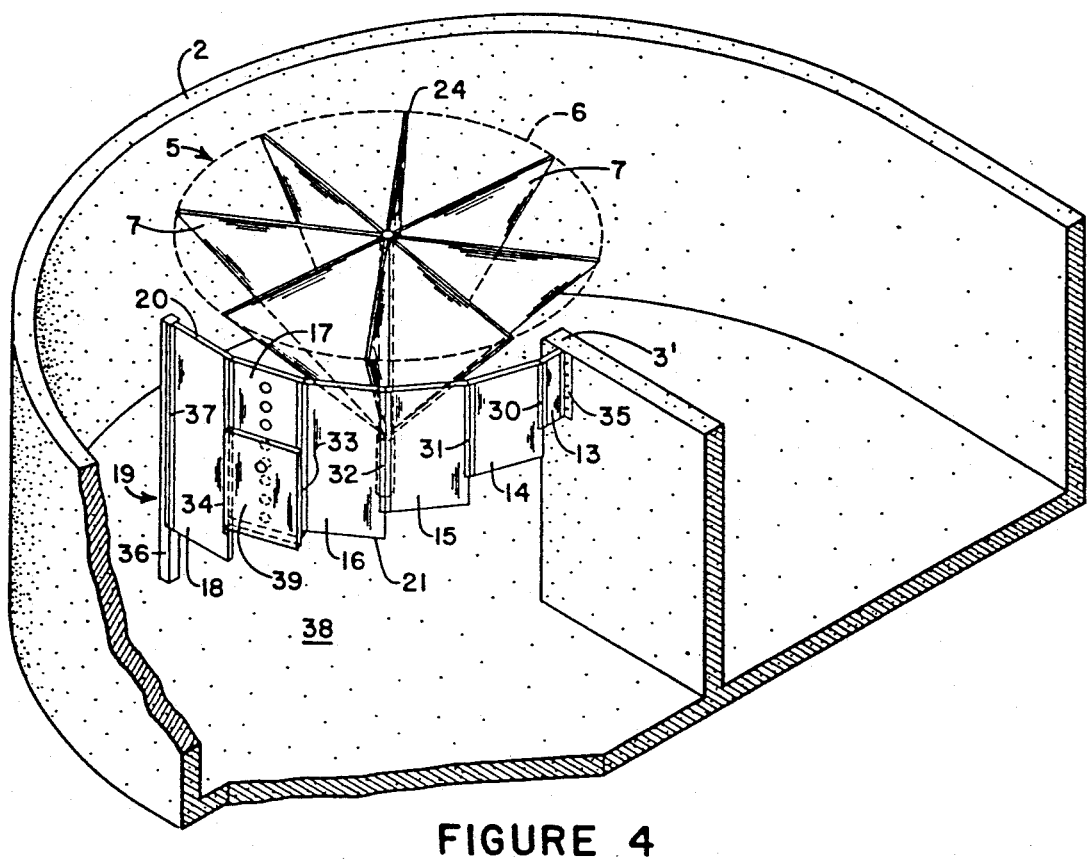
FIG. 4 is a frontal view of one preferred embodiment of the baffle means of this invention taken along lines 4—4 of FIG. 3.
Figure 5:
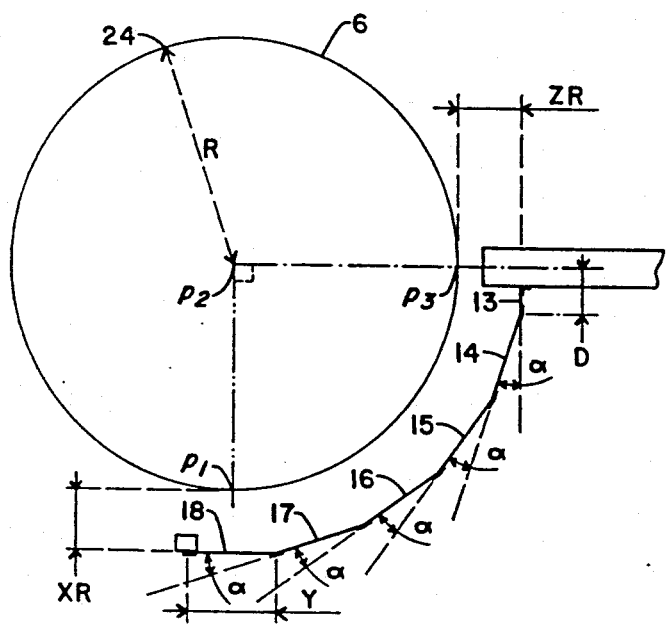
FIG. 5 is a top view schematic illustrating preferred positions of the baffle plate members.

FIG. 2 depicts a similar oxidation ditch as shown in FIG. 1 except that an intra-channel clarifier 11 is also used with the external clarifier 9. Clarified water is removed from clarifier 11 by duct 11' and discharged to a stream or other body of water. It is noted that it may not be necessary or desirable to use the external clarifier 9 when using an intra-channel clarifier 11. In this situation part of the waste water upstream of the turbine 5 enters into clarifier 11 either through openings in its bottom front, side or its rear section. In either case it is desirable that the turbulence of the waste water entering clarifier 11 be reduced as much as possible in order to more efficiently separate the waste from the water. Unfortunately the backwash created by the turbine increases the turbulence of the waste water entering clarifier 11. Turning now to the preferred embodiments of the invention as shown in FIGS. 3-5 a baffle 12 is positioned upstream of turbine 5. If an intra-channel clarifier 11 is used, then baffle 12 is positioned between turbine 5 and intra-channel clarifier 11.

In a preferred embodiment baffle 12 comprises multiple panel members 13-18 which are fixed in frame assembly 19 to form a generally arcuate shaped top edge 20. In one embodiment panel members 13-18 are held rigidly in position by brackets 30-34 which are bolted or welded to the panel members as shown in FIG. 4. Panel member 13 will be attached to partition wall end 3' by angle bracket 35. At the opposite end of baffle 12, panel member 18 is attached to end post 36 by angle bracket 37. End post 36 extends vertically from the channel bottom 38 as shown. It is preferred that the bottom edge 21 be positioned at depths to allow a waste water velocity between 12 and 17 feet/second in the channel area where the waste water enters the turbine. More preferably each successive panel member beginning with panel member 13 adjacent to partition wall end 3' will be of greater length so that when their top edges are aligned each corresponding bottom edge 21 will be positioned deeper into the waste water stream. It has been found that this velocity range can be achieved if the length of each panel be such that its corresponding bottom edge 21 is positioned so that the middle point of bottom edge 21 is on a line "$L_2$" that is at an angle $\beta$ of 15°-20°, most perferably 8°, from a line "$L_2$" passing through the center of the plane "$P_1$" formed by the base 22 of the turbine blades 7 which is parallel to the bottom of the channel 4. The number of panel members can vary depending on the size and design of the turbine and the configuration of the ditch, however it is preferred that there be at least six panels in order to achieve the desired reduction in turbulence caused by the backwash yet not impede unreasonably the normal flow of the waste water. In a preferred embodiment, the baffle means could be constructed so that at least one of the baffles is vertically adjustable by means of various fasteners. The frame assembly 19 as shown in FIG. 4, is comprised of panel members 13-18. The bottom edge of plate 39 may be positioned at various depths in the waste water stream so as to regulate the flow of said stream between 12 and 17 feet per second. In a most preferred embodiment there could be a single panel specifically shaped for a particular turbine and ditch configuration. In an alternate embodiment the panel member(s) could be constructed as an extension of the partition wall 3. It is most preferred that the baffle 12 extend from partition wall 3 to at least a point "$P_1$" located on the circle 6 formed by the tips 24 of the blades 7 which with the center "$P_2$" of the circle and point "$P_3$" form an angle of 90 degrees. Point "$P_3$" is located on circle "C" at a position determined by the tangent to the circle at a point closest to the partition wall 3.

When multiple panel members are utilized it is preferred that the middle panel members 15-17 be offset from one another at an equal angle $\alpha$.

EXAMPLE

Based on experimentation when utilizing a BOAT ® intra-channel clarifier configuration the following empirical formula are preferred in designing a workable baffle means.

Step 1

To determine the distance from the turbine blade tip to the baffle panel member extending from the partition wall solve for the following equation:

$$Z = [(0.0441 \times R^2 \times S) - 6.46R]/(7.4R + 2.76)$$

wherein
R = turbine radius
S = rpm of turbine
to achieve a 15 foot/second velocity in the pumping zone of the vertical turbine.

Step 2

To determine point "$p_1$" solve for the following equation:

$$X = [(0.0441R^2 = S) - 5.65R]/(6.47R + 2.416)$$

to achieve a 12.75 foot/second velocity at point '$p_1$'.

Step 3

To determine the length of the panel member to achieve point "$p_1$" solve for the following equation:

$$Y = (Z - 0.0026)R$$

Step 4

Since the partition wall thickness varies on each oxidation ditch, it is necessary to determine the width of the panel member adjacent the partition wall as follows:

$$D = (1 + X)R - 0.2995R$$

Step 5

Figure 6:
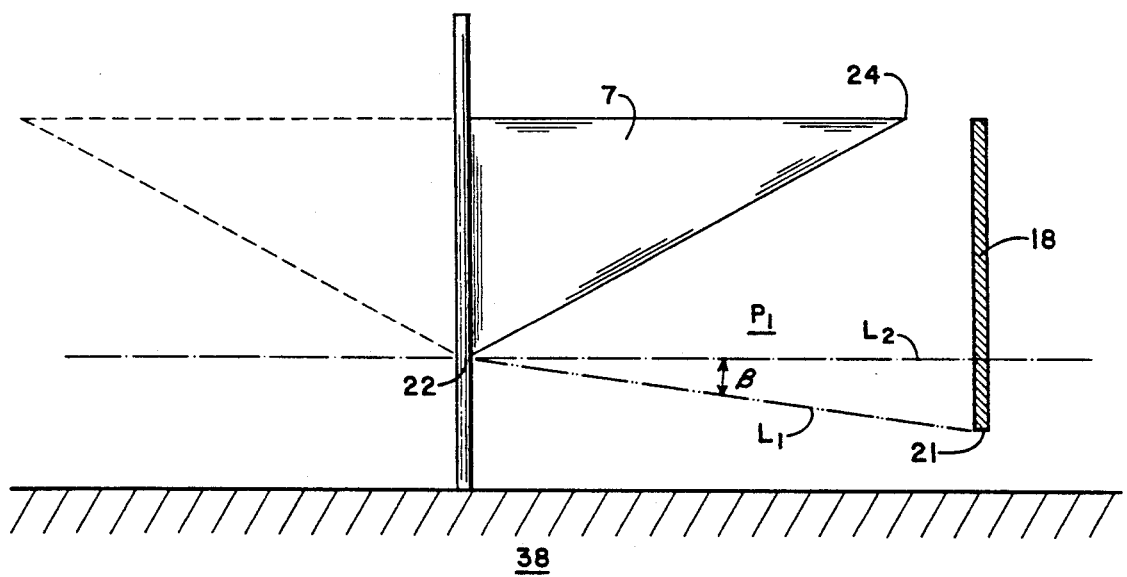
FIG. 6 is a side view schematic illustrating preferred positions of the baffle plate members.

Each of the other panel member alignments are factors of R at 18 degrees as shown in FIG. 6.

Step 6

To determine the depth or position of the bottom edge of a panel member solve for the following equation:

$$H = [0.32492 (1 + Z)]R.$$

With the information from each of the above steps it is now possible to construct a baffle according to this invention.

There are of course other alternate embodiments, such as constructing the baffle integrally with the oxidation ditch in lieu of a separate structure added to the oxidation ditch which are obvious from the foregoing descriptions of the invention which are intended to be included within the scope of the invention as defined by the following claims.

What I claim is:

1. An oxidation ditch for treating waste water having (a) a channel through which said waste water flows, said channel being formed by a bottom, a continuous outside vertical wall extending upward from said bottom and having one or more curved sections and a partition wall positioned vertically upward from said bottom and inside said continuous outside vertical wall and (b) a vertical turbine having rotating blades and fixedly mounted in a portion of said channel formed by one of said curved sections and said partition wall to receive and aerate the waste water to a predetermined amount as it flows through said channel, the improvement of which comprises a baffle means fixedly positioned in said channel upstream of said vertical turbine and shaped to receive at least some of the backwash resulting from said waste water flowing through said vertical turbine and to prevent said backwash from creating turbulence in said waste water upstream of said vertical turbine and to allow said vertical turbine to aerate said waste water to said predetermined amount, wherein said baffle means comprises a panel member extending from said partition wall and has a bottom edge extending into said wastewater in a manner such that any point on said bottom edge extends at least as deep as any other point on said bottom edge which is closer to said partition wall, and wherein the middle point of said bottom edge is positioned on a line that is at an angle of between 15 and 20 degrees from a line passing through the center of a plane formed by the base of said turbine blades, said plane being parallel to said bottom of said channel.

2. An oxidation ditch according to claim 1 wherein said bottom edge is positioned at depths to allow said vertical turbine to cause said waste water to flow at a waste water velocity between 12 and 17 feet per second in an area located where said waste water enters said vertical turbine.

3. An oxidation ditch according to claim 2 wherein one side of said panel member is attached to and extends from said partition wall parallel to the tangent at one point of the circle formed by the tip of said blades closest to said one side, and its opposite side is positioned parallel to the tangent at a second point of said circle which with the center of said circle and said first point form an angle of about 90°.

4. An oxidation ditch according to claim 1 wherein said panel member comprises multiple plates at least one of which is constructed to be vertically adjustable.

5. An oxidation ditch according to claim 1 wherein said panel member extends arcuately from said partition wall partially about said vertical turbine.

* * * * *